United States Patent
Jaunich

(10) Patent No.: US 6,605,880 B1
(45) Date of Patent: Aug. 12, 2003

(54) ENERGY SYSTEM PROVIDING CONTINUAL ELECTRIC POWER USING WIND GENERATED ELECTRICITY COUPLED WITH FUEL DRIVEN ELECTRICAL GENERATORS

(75) Inventor: Greg J. Jaunich, North Oaks, MN (US)

(73) Assignee: Navitas Energy, Inc., Minneapolis, MN (US)

( * ) Notice: Subject to any disclaimer, the term of this patent is extended or adjusted under 35 U.S.C. 154(b) by 312 days.

(21) Appl. No.: 09/630,375

(22) Filed: Aug. 1, 2000

(51) Int. Cl.[7] .................................................. H02J 1/00
(52) U.S. Cl. ............................ 307/80; 307/52; 307/57; 307/60; 307/84
(58) Field of Search .................................. 290/1 R, 4 R, 290/4 A, 2, 44, 45; 307/66, 84, 125, 151, 60, 57, 52, 80; 363/34; 322/19

(56) References Cited

U.S. PATENT DOCUMENTS

| | | | |
|---|---|---|---|
| 3,974,394 A | 8/1976 | Bailey | 290/44 |
| 4,035,659 A * | 7/1977 | Jeppson | 307/84 |
| 4,184,084 A | 1/1980 | Crehore | 290/55 |
| 4,229,941 A | 10/1980 | Hope | 60/641 |
| 4,236,083 A | 11/1980 | Kenney | 290/55 |
| 4,274,010 A | 6/1981 | Lawson-Tancred | 290/55 |
| 4,315,163 A | 2/1982 | Bienville | 307/66 |
| 4,349,744 A * | 9/1982 | Reuther et al. | 290/44 |
| 4,433,544 A | 2/1984 | Well et al. | 60/640 |
| 4,445,049 A | 4/1984 | Steigerwald | 307/45 |
| 4,464,579 A * | 8/1984 | Schwarz | 290/44 |
| 4,556,801 A | 12/1985 | Gervasio et al. | 290/44 |
| 4,565,929 A * | 1/1986 | Baskin et al. | 290/44 |
| 4,719,550 A | 1/1988 | Powell et al. | 363/37 |
| 5,103,646 A | 4/1992 | Fini | 60/698 |
| 5,206,537 A | 4/1993 | Alejandro | 290/1 |
| 5,254,876 A | 10/1993 | Hickey | 290/55 |
| 5,394,016 A | 2/1995 | Hickey | 290/55 |
| 5,536,976 A * | 7/1996 | Churchill | 290/4 A |
| 5,548,504 A | 8/1996 | Takehara | 363/65 |
| 5,592,028 A * | 1/1997 | Pritchard | 290/55 |
| 5,740,677 A | 4/1998 | Vestesen | 60/698 |
| 5,793,593 A | 8/1998 | Reed et al. | 361/93 |
| 5,892,664 A | 4/1999 | Vedder | 363/17 |
| 6,023,105 A | 2/2000 | Youssef | 290/54 |
| 6,172,432 B1 * | 1/2001 | Schnackenberg et al. | 307/125 |

* cited by examiner

*Primary Examiner*—Brian Sircus
*Assistant Examiner*—Robert L. DeBeradinis
(74) *Attorney, Agent, or Firm*—Kinney & Lange, P.A.

(57) ABSTRACT

The process provides constant electric power from a combination of a wind energy generator and a firm secondary generator. The wind energy generator and the secondary generator supply electricity directly to a utility transmission system. The secondary generator must be able to provide power on demand that will meet a utility's needs. The secondary generator is preferably a natural gas turbine, but may be a hydrogen fuel cell, a diesel internal combustion engine, or any other similar technology.

20 Claims, 1 Drawing Sheet

ENERGY SYSTEM PROVIDING CONTINUAL ELECTRIC POWER USING WIND GENERATED ELECTRICITY COUPLED WITH FUEL DRIVEN ELECTRICAL GENERATORS

CROSS-REFERENCE TO RELATED APPLICATION(S)

None.

BACKGROUND OF THE INVENTION

The present invention relates to a method for generating power that is delivered to a utility. More particularly, the invention relates to a method that utilizes a combination of wind and a secondary source to generate the power.

Global energy consumption is a major contributor to increases of greenhouse gases in the atmosphere. Carbon dioxide is the leading greenhouse gas that has been implicated in climate changes worldwide. Reportedly, about 22 billion tons of carbon dioxide was released into the atmosphere in 1990 with projections that reached up to 128 billion tons by 2100 at current increases of energy use. In addition, emissions from coal-fired power plants, which are a major contributor to air pollution, have been linked to serious health threats such as asthma attacks and premature death.

Renewable energy sources, such as wind, offer an alternative which would significantly decrease the projected rise in carbon dioxide levels and decrease the amount of air pollution. Advances in technology offer a new way to meet a major part of the world's demand for energy.

A major problem with a renewable source like wind is its intermittent nature. Wind speeds fluctuate hourly and have characteristic seasonal patterns that do not correlate with peak energy use by consumers. Therefore, by itself, energy generated by wind may not be able to provide enough energy at a given time.

In order for wind energy to be useful, a back-up source of energy needs to be used in conjunction with the wind source. Various methods and systems have been developed to provide the needed back-up power, but so far these have not been seen as a viable alternative to utility companies.

It is also argued that wind alone is not cost effective compared to the more traditional sources of energy. Therefore, cost barriers must be overcome in order to use wind-generated energy. In light of these problems, a need exists to efficiently utilize wind such that it will be useful to a utility company as a reliable source of electric power.

BRIEF SUMMARY OF THE INVENTION

The invention is a method for producing electric power that can be maintained at a desired capacity. The method utilizes a primary generator that produces grid-compatible electric power via wind energy. A secondary source that is not powered with wind may also produce grid-compatible electric power. The electric power from both sources is delivered to a utility grid in a coordinated manner.

DETAILED DESCRIPTION

Figure 1:
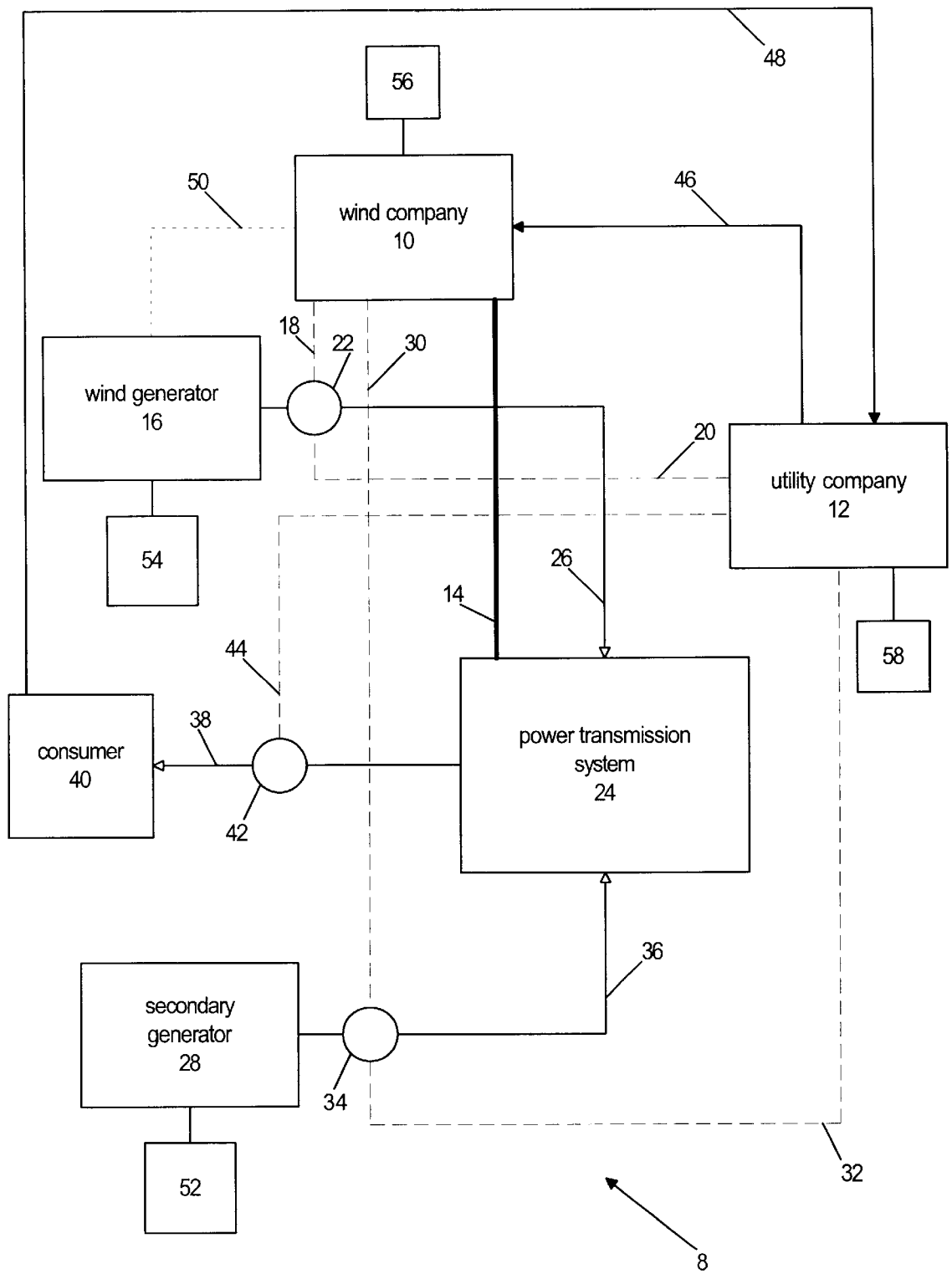
FIG. 1 is a schematic block diagram of the energy system of the invention.

FIG. 1 is a schematic representation of energy system 8 that shows how components of energy system 8 interact. Energy system 8 includes of wind company 10, utility company 12, communication link 14, wind generator 16, lines 18 and 20, meter 22, power transmission system 24, cable 26, secondary generator 28, lines 30 and 32, meter 34, cables 36 and 38, consumer 40, meter 42, line 44, line 50, control receiver 52, control receiver 54, and generator controllers 56 and 58.

Wind company 10 and utility company 12 communicate over communication link 14 regarding levels of electric power output. Wind company 10 is linked to wind generator 16 via line 18, and line 20 links wind generator 16 to utility company 12. Power is delivered from wind generator 16 to power transmission system (utility grid) 24 through cable 26. Meter 22 measures electric power output from wind generator 16 and sends the reading to wind company 10 and utility company 12 along lines 18 and 20, respectively. Maintenance and meteorological data from wind generator 16 are also sent to wind company 10 along line 50. Generator controller 56 of wind company 10 and generator controller 58 of utility company 12 are operationally coupled to control receiver 54 of wind generator 16. Secondary generator 28 delivers electric power to power transmission system 24 through cable 36. Meter 34 measures electric power output of secondary generator 28 and sends the reading to wind company 10 and utility company 12 along lines 30 and 32, respectively. Generator controller 56 of wind company 10 and generator controller 58 of utility company 12 are operationally coupled to control receiver 52 of secondary generator 28.

Cable 38 connects power transmission system 24 to consumer 40. Meter 42 measures the amount of electric power delivered to consumer 40 from power transmission system 24 and sends the reading to utility company 12 along line 44.

In operation, wind company 10 and utility company 12 communicate over communication link 14 and agree on a desired quantity of electric power that wind company 10 will provide. Wind generator 16 is the primary source for the electric power. The total number of wind generators 16 used depends on the total number of megawatts that wind company 10 has agreed to produce.

In a preferred embodiment, wind generators 16 will be dispersed throughout different geographical regions. Having different locations provides optimum wind resource capture, because wind may be blowing in some locations and not in others and having dispersed wind generators 16 increases the chance that at least some of them will be operating at any given time.

The preferred embodiment has each wind generator 16 mounted on a tower 65 meters (213 feet) high. The towers are made of tubular steel, specifically Patrick & Henderson "Tensionless Tube", and anchored to concrete foundations. Each tower is placed about six rotor diameters (282 meters or 922 feet) apart in rows with each row being minimally 7 rotor diameters (329 meters or 1076 feet) apart. Wind generators 16 require an uninterrupted wind flow, and any obstructions such as trees or tall structures within approximately 1,300 feet upwind will decrease wind generator 16 output. To provide a margin of safety, towers are placed minimally 300 feet from public roads and 1000 feet from residences.

Preferably, wind generators 16 are a combination of Vestas-V47 and -V66 and NEG Micon-NM48 and -NM52 wind turbines ranging in capacity from 660–1650 kWh. The wind turbines are constant speed, AC induction generators producing long term grid-compatible electricity with an average life of 25 years.

The amount of electric power generated by wind generator 16 is measured by meter 22, and this reading is sent to wind company 10 along line 18. At the same time, the reading from meter 22 is sent to utility company 12 along line 20. Other information, besides readings from meter 22, is also sent from wind generator 16 to wind company 10 such as wind speed, wind direction, reactive power, grid and generator outage time, hydraulic oil temperature, error logs, rotor and generator rpm, etc., along line 50. In addition, meteorological measurements are sent back to wind company 10 along line 50. The additional information is used to determine if maintenance on wind generator 16 is needed, to create performance curves, and to evaluate the wind resource. The meteorological measurements are needed if there is a dispute about the amount of electric power generated versus what was guaranteed, because it is determined by generator output at a specific wind speed.

In the preferred embodiment, wind company 10 controls wind generator 16 by transmitting control from generator controller 56 to control receiver 54. However, control of wind generator 16 could also be transmitted by generator controller 58 of utility company 12 to control receiver 54. This control is needed, for instance, for maintenance reasons or to restart wind generator 16 if it turns off. The monitoring system discussed above that, in part, determines how wind generator 16 is controlled is a Supervisory Control and Data Acquisition or SCADA System.

The electric power generated by wind generator 16 is fed to power transmission system 24 via cable 26 at the proper frequency, voltage, and phase. In one embodiment, cable 26 is a 34.5 kV underground cable, and the electric power is carried at 690 volts to a pad-mounted transformer. There is one transformer per wind generator 16. The electric power from each transformer is collected by underground cable and delivered to a collector line that will extend to an interconnection station. Once the electric power is collected, the function of power transmission system 24 is to deliver the electric power to wherever it is needed.

Secondary generator 28 runs simultaneously with wind generator 16. The intermittent nature of wind precludes it from being a reliable or "firm" energy source by itself. Therefore, in order to ensure that utility company 12 receives the power capacity of wind generator 16 on demand even if there is low wind or an outage, secondary generator 28 acts as a back-up source and must be able to provide at least equivalent power. Secondary generator 28 is a firm energy source such as a natural gas turbine, a hydrogen fuel cell, a diesel internal combustion engine, or any similar technology. In a preferred embodiment, secondary generator 28 is a natural gas turbine. The combination of wind and natural gas provides the cleanest form of firm electric power generation available in the marketplace.

Another factor to consider in choosing an energy source for secondary generator 28 is its modularity. The secondary source should preferably be small enough to be utilized by a small utility company with the option to add power at a later time with increased demand. At the same time, it should be useful to a large central plant with radial transmission. The preferred embodiment using a natural gas turbine can produce as low as one megawatt of electric power and as high as hundreds of megawatts of electric power.

The number of secondary generators 28 used depends on the quantity of power that is required. The location of secondary generators 28 depends on several factors. For example, sites for natural gas turbines depend on the availability of a natural gas supply, transmission constraints, and costs.

In the preferred embodiment, the natural gas turbines are pairs of Pratt & Whitney FT8 Power Pak Industrial Gas Turbines. Each turbine has a base load rating of 27.435 MW and can be configured for water injected or gas applications.

Upon receiving the reading from meter 22 as to the amount of electric power generated by wind generator 16, utility company 12 can control, by transmission to control receiver 52 from generator controller 58, the amount of electric power that secondary generator 28 needs to produce to meet the demand. Utility company 12 has the flexibility to use secondary generator 28 on an as-needed basis or to provide electric power to meet peak electricity demands while wind generator 16 is generating electric power, which saves generating costs and spot market energy purchases. It also reduces the hours that secondary generator 28 needs to operate.

Alternatively, or additionally, wind company 10 can purchase electric power from the open market to supplement the energy requirements of utility company 12.

The electric power generated by secondary generator 28 is measured by meter 36. The reading is sent to wind company 10 along line 30 and to utility company 12 along line 32. The electric power is carried to power transmission system 24 through cable 36. One aspect of the novelty of this invention is that the energy generated from wind generator 16 and secondary generator 28 is not stored but rather delivered directly to power transmission system 24. This allows the energy to be available immediately upon being generated.

Once the electric power is collected by power transmission system 24, it is distributed to consumer 40 by cable 38. The electric power produced is grid-compatible electricity. Meter 42 measures how much electric power is delivered to consumer 40, and this reading is sent to utility company 12 along line 44. As discussed, utility company 12 determines, based on these readings, how much electric power needs to be produced and controls the output of secondary generator 28 through generator controller 58 and control receiver 52 accordingly. Alternatively, control of secondary generator 28 could be with wind company 10. Generator controller 56 of wind company 10 can transmit control to secondary generator 28 through control receiver 52. The control of either wind generator 16 or secondary generator 28 by wind company 10 or utility company 12 may done automatically by a computer system.

Another aspect of energy system 8 involves cash flow between the various components. Cash flow 46 runs from utility company 12 to wind company 10. Cash flow 48 runs from consumer 40 to utility company 12.

In operation, utility company 12 pays wind company 10, as shown by cash flow 46, for electric power generated by wind generator 16 and secondary generator 28. Consumer 40, in turn, pays utility company 12, as shown by cash flow 48, for the electric power consumed.

The method solves the cost effectiveness problem of using wind energy. Natural gas supplies the peak power needs, and a higher price is demanded for this electric power. The additional income that this generates will offset the lower price that is paid for base power generated by wind energy.

In a preferred embodiment, wind company 10 can generate electric power over and above what is required by utility company 12 to sell on the open market. This would allow consumers located in other regions of the country the opportunity to purchase electric energy that was generated by a more environmentally friendly means.

Although the present invention has been described with reference to preferred embodiments, workers skilled in the art will recognize that changes may be made in form and detail without departing from the spirit and scope of the invention.

What is claimed is:

1. A method for producing energy that can be maintained at specific capacities comprising:
   producing grid-compatible electric power with a primary generator which utilizes wind energy as a primary source of energy;
   producing grid-compatible electric power with a secondary generator that utilizes a secondary source of energy which is not wind energy; and
   controlling, as a function of the produced electric power from the primary generator that is delivered directly to a utility grid, production of the grid-compatible electric power from the secondary generator that is delivered directly to the utility grid.

2. Thie method of claim 1 wherein the primary generator includes at least one wind turbine.

3. The method of claim 1 wherein the electric power generated from the primary and secondary generators is not stored.

4. The method of claim 1 and further comprising:
   sensing data relating to maintenance of the primary generator; and
   sensing meteorological data at the primary generator.

5. The method of claim 1 wherein the primary generator runs continuously.

6. The method of claim 1 wherein the secondary generator is derived from a firm energy source.

7. The method of claim 1 and further comprising:
   sensing the electric power generated from the primary generator; and
   controlling the electric power generated from the secondary generator based on the amount of electric power sensed from the primary generator.

8. The method of claim 7 wherein the control is provided automatically by a computer system.

9. The method of claim 7 wherein a utility company controls operation of the secondary generator.

10. The method of claim 7 wherein a wind company controls operation of the secondary generator.

11. The method of claim 1 wherein the electric power generated by each generator is delivered underground to the utility grid.

12. The method of claim 1 wherein a plurality of wind generators are dispersed to different locations.

13. The method of claim 1 wherein the secondary generator includes at least one natural gas turbine.

14. The method of claim 13 wherein the natural gas turbine provides at least about 1 megawatt of electric power.

15. The method of claim 1 wherein the secondary generator can at least provide electric power to meet a utility's need on demand.

16. The method of claim 15 wherein the secondary generator can provide electric power above the capacity generated by the primary generator to meet peak demands.

17. The method of claim 1 wherein the electric power is available to be sold on all open market.

18. A method for producing energy that can be maintained at specific capacities comprising:
   producing electric power with a wind turbine, and delivering essentially all the produced electric power to a utility grid;
   producing electric power with a secondary source that is a natural gas turbine; and
   controlling production, as a function of all the produced electric power from the wind turbine delivered to the utility grid, of the electric power generated by the natural gas turbine that is delivered to the utility grid.

19. A method of producing grid-compatible energy that can be maintained at specific capacities comprising:
   producing electric power with a primary generator that utilizes wind energy and has a first peak capacity;
   producing electric power with a secondary generator that utilizes a secondary energy source which is not wind energy and is operationally associated with the primary generator and has a second peak capacity at least large enough to meet a utility's demand;
   monitoring electric power produced by the primary generator and delivered to a utility grid;
   monitoring electric power produced by the secondary source and delivered to the utility grid; and
   controlling production of electric power from the secondary generator as a function of the monitored electric power from the primary generator.

20. The method of claim 19 wherein the secondary generator has a peak capacity at least equivalent to the first generator.

* * * * *